United States Patent [19]

Wang et al.

[11] Patent Number: 5,436,992
[45] Date of Patent: Jul. 25, 1995

[54] LITHIUM NIOBATE OPTICAL TE-TM MODE SPLITTER

[75] Inventors: Way-Seen Wang; Pei-Kuen Wei, both of Taipei, Taiwan

[73] Assignee: National Science Council, Taipei, Taiwan

[21] Appl. No.: 324,690

[22] Filed: Oct. 18, 1994

[51] Int. Cl.$^6$ .............................................. G02B 6/26
[52] U.S. Cl. ........................................ 385/45; 385/14; 385/28; 385/142
[58] Field of Search ................ 385/132, 14, 28, 39, 385/45, 50, 141, 142, 144, 130–131

[56] References Cited

U.S. PATENT DOCUMENTS 4,427,260  1/1984  Puech et al. .................... 385/131
4,447,116  5/1984  King et al. ..................... 385/130

OTHER PUBLICATIONS

Oliveira et al; Conference: Electro–Optics/Laser International '80 U.K, Bringhton, England (Mar. 1980); pp. 38–49.
Ogusu; Optics Communication, vol. 53, No. 3; Mar. 1985; pp. 169–172.
Way–Seen Wang & Pei–Kuen Wei, "Fabrication of Lithium Niobate Optical Channel Waveguides by Nickel Indiffusion", Microwave and Optical Technol. Lett., vol. 7, No. 5, pp. 219–221, 1994.
Way–Seen Wang and Pei–Kuen Wei, "A TE–TM Mode Splitter on Lithium Nobate Using Ti, Ni and MgO Diffusions", IEEE Photon, Technol. Lett., vol. 6, No. 2, pp. 245–248, 1994.
Way–Seen Wang and Pei–Kuen Wei, "Novel TE–TM Mode Splitter on Lithium Niobate Using Nickel Indiffusion and Proton Exchange Techniques", Electronics Lett., vol. 30, No. 1, pp. 35–37, 1994.
C. S. Lau, P. K. Wei, C. W. Su and W. S. Wang, "Fabrication of Magnesium Oxide Induced Lithium Outdiffusion Waveguides", Photon. Technol. Lett., vol. 4, No. 8, pp. 872–875, 1992.
M. N. Armenise, "Fabrication Techniques of Lithium Niobate Waveguides", IEE Proc. J., vol. 135, No. 2, pp. 85–91, 1988.

*Primary Examiner*—Rodney B. Bovernick
*Assistant Examiner*—John Ngo
*Attorney, Agent, or Firm*—Bacon & Thomas

[57] ABSTRACT

We disclose a new optical TE-TM mode splitter on lithium niobate. The splitter is fabricated by using an asymmetric Y-junction structure which is composed of a straight waveguide, and two branch waveguides. The straight waveguide is the input one that can guide randomly-polarized light (i.e. both TE and TM modes). The two branch waveguides are the output ones, and one of them can guide only the TE mode, the other can guide only the TM mode. Because the output waveguides can individually guide the TE and TM modes, the input modes are then split by the branch waveguides. The input waveguide is fabricated by diffusing titanium into lithium niobate. The two output waveguides are made by nickel indiffusion and magnesium-oxide induced lithium outdiffusion or proton exchanged techniques.

4 Claims, 3 Drawing Sheets

LITHIUM NIOBATE OPTICAL TE-TM MODE SPLITTER

BACKGROUND OF THE INVENTION

Optical TE-TM mode splitters are important optical devices, so far, various guided-wave TE-TM mode splitters have been demonstrated or modeled. Those splitters can be divided into two groups. One uses the optical interference in a directional coupler. The TE and TM modes of a the coupler can be split by the difference of their coupling lengths. However, this type mode splitter needs a very careful design to achieve a high extinction ratio. It has low fabrication tolerance, and can only be operated under single-mode condition. The other uses an asymmetrical Y-junction structure. The incident TE and TM modes are split by two output arms due to their different preferences of polarization. In practical application, those which use the Y-branch have a larger fabrication tolerance. But the fabricated device is fundamentally based on the adiabatic mode conversion of the extraordinary-polarized mode. A careful design of the waveguide pattern for a specific index distribution is then required to obtain a maximum extinction ratio. To our knowledge, an ideal TE and TM mode splitter, in which each branching waveguide supports only a single-polarized wave (TE or TM), has not been demonstrated.

Therefore, an object of the present invention is to provide a new TE-TM mode splitter, which has a high fabrication tolerance, a high extinction ratio and is capable of operating within a wide range of wavelength, either single mode or multimode.

SUMMARY OF THE INVENTION

In order to accomplish the above object, a lithium niobate optical TE-TM mode splitter constructed according to the present invention comprises an asymmetric Y-junction structure in a lithium niobate substrate. The Y-junction structure consists of an input straight waveguide and two output branch waveguides. The input straight waveguide is a titanium indiffusion (TI) channel waveguide made by diffusing titanium into the lithium niobate substrate, and it can guide both the TE and TM modes. One of the two output branch waveguides is a nickel indiffusion (NI) channel waveguide made by diffusing nickel into said lithium niobate substrate, and it can guides only the ordinary-polarized mode. The other output branch waveguide is a MgO induced lithium outdiffusion (MILO) channel waveguide or a proton exchanged (PE) channel waveguide, and they both guide only the extraordinary-polarized mode in the lithium niobate substrate. As the ordinary- and the extraordinary-polarized waveguides can be fabricated by NI and MILO (or PE) techniques, respectively. The present inventors can then use a Y-junction structure, where the TE and TM modes originally guided by a TI channel waveguide are directed to the NI and MILO (or PE) channel waveguides according to the orientation of lithium niobate. Thus, an ideal TE-TM mode splitter with high extinction ratio and capable of operating with a wide range of wavelength, either single mode or multimode, can be realized.

Preferably, said nickel indiffusion channel waveguide is made by a process which comprises the following steps: depositing a nickel strip of width of 3-12 μm and thickness of 100-800Å on said lithium niobate substrate, and then heating the deposited lithium niobate substrate at 950°-1050° C. for 1-12 hours.

Preferably, said MgO induced lithium outdiffusion channel waveguide is made by a process which comprises the following steps: depositing a MgO strip of width of 3-12 μm and thickness of 100-800Å on said lithium niobate substrate, and then heating the substrate at 900°-1050° C. for 0.1-1.0 hour.

Preferably, said proton exchanged channel is made by a process which comprises the following steps: depositing a masking layer of a metal film having a thickness of 400-2000Å on said lithium niobate substrate, opening a waveguide pattern of width 3-12 μm on the masking layer, and then immersing the resulting patterned lithium niobate substrate into an acid at 150°-250° C. for 1-12 hours.

DETAILED DESCRIPTION OF THE INVENTION

Traditional TE-TM mode splitters on lithium niobate are mostly based on the directional couplers. Because of the coupling behavior, the splitters suffer the problems of low fabrication tolerance, smaller extinction ratios (always smaller than 15 dB), and operation only under single-mode conditions. It is well known that the TI Waveguides can guide both the ordinary-polarized and extraordinary-polarized waves in lithium niobate. MILO or PE waveguides in lithium niobate can guide only extraordinary-polarized wave. Recently, we also found that NI waveguides can only guide ordinary-polarized wave in lithium niobate under certain diffusion conditions. Hence, if a y-cut x-propagated lithium niobate substrate is used, a novel TE-TM mode splitter can be made by using a Y-junction structure with the input waveguide made by TI process, one arm of Y-junction structure made by the NI process, and the other arm made by the MILO or PE process. The input FE and TM modes are guided by the TI waveguide. When both modes arrive to the branch, the TM and TE mode will direct to the NI and MILO (or PE) waveguides, respectively. This splitter can be realized to have high extinction ratio, large fabrication tolerance, and be operated under single-mode or multi-mode conditions.

Figure 1:
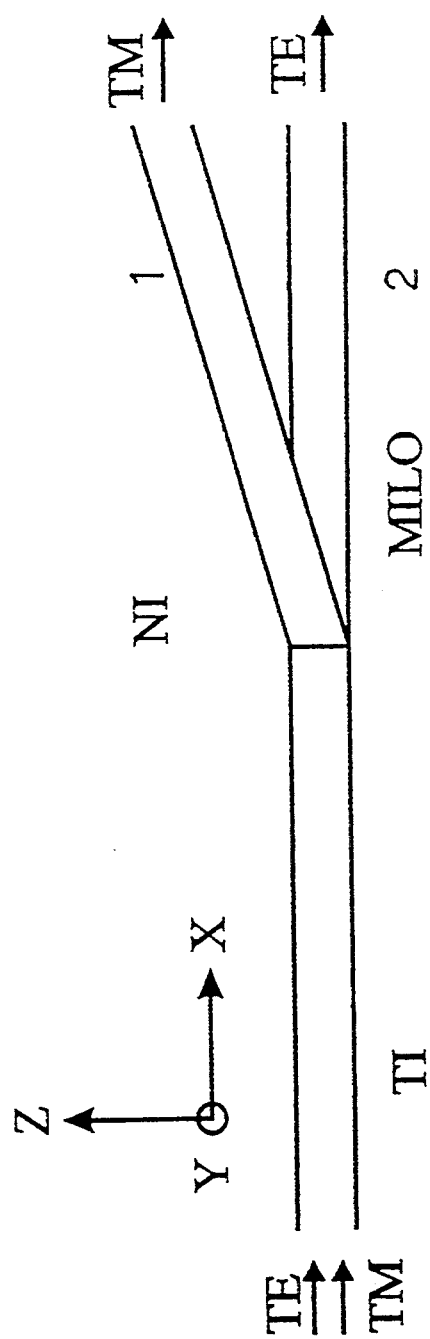
FIG. 1 illustrates an Y-branch TE-TM mode splitter on y-cut x-propagated lithium niobate substrate.

We have made two new types of TE-TM mode splitters, type 1 is fabricated by TI, NI and MILO waveguides on a y-cut, x-propagating lithium niobate substrate. The splitter is shown in FIG. 1. The input waveguide is made by TI process. Arm 1 of the Y-junction structure, bent from the taper region at an angle of about 0.5 degree, is made by the NI process, and arm 2 of the Y-junction structure, disconnected to the TI waveguide, is made by the MILO process. The fabrication of the TI waveguide can be referred to M. N. Armenise, "Fabrication techniques of lithium niobate waveguides," *IEE Proc. J.*, vol. 135, no. 2, pp. 85–91, 1988. The fabrication of the NI waveguide can be referred to the our published letter, "Fabrication of lithium niobate optical channel waveguides by nickel indiffusion," *Microwave and Optical Technol. Lett.*, vol. 7, no. 5, pp. 219–221, 1994. The fabrication of the MILO waveguide can be referred to C. S. Lau, P. K. Wei, C. W. Su, and W. S. Wang, "Fabrication of magnesium oxide induced lithium outdiffusion waveguides," *Photon. Technol. Lett.*, vol. 4, no. 8, pp. 872–875, 1992. The disclosure of these three references are incorporated herein by reference.

Type 2 splitter is made by TI, NI, and PE waveguides. It is almost the same as the above type 1 splitter, except that arm 2 of the Y-junction structure is made by the PE process instead of the MILO process. The PE waveguide in this case plays the same role as the MILO waveguide that guides only the extraordinary-polarized wave in lithium niobate.

EXAMPLE 1

The waveguides in the splitter (shown in FIG. 1) are made with the fabrication parameters as listed in Table 1. As the TI waveguide needs a longer diffusion time and higher diffusion temperature than those of the other waveguides, the TI waveguide was made first. The titanium film was deposited by electron gun evaporation and diffused into lithium niobate in an alumina crucible with a little lithium oxide powder to eliminate the unwanted outdiffusion guiding layer. The NI and MILO waveguides were then made in the same alumina crucible. Note that titanium, MgO oxide and nickel films can also be deposited by R. F. sputtering.

TABLE 1

| Waveguide | Diffusion temp.(°C.) | Diffusion time (hr) | Waveguide width (μm) | Film thickness(Å) |
|---|---|---|---|---|
| TI | 1050 | 8 | 4 | 200 |
| NI | 960 | 2.5 | 4 | 180 |
| MILO | 960 | 2.5 | 4 | 450 |

Figure 2A:
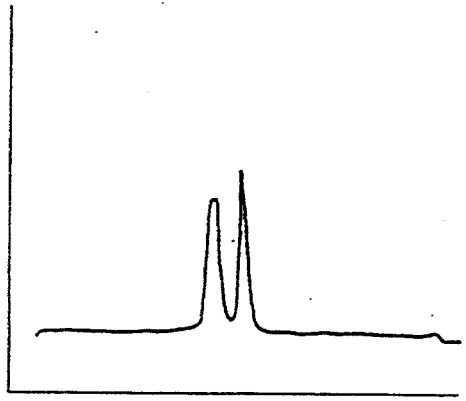
FIGS. 2(a) to 2(c) are plots which shows near field distributions at the output end of the present splitter (type 1 ): 2(a) both TE and TM modes; 2(b) TE mode; and 2(c) TM mode, wherein the strip widths of the TI, NI, and MILO waveguides are all equal to 4 μm.
Figure 2B:
Figure 2C:
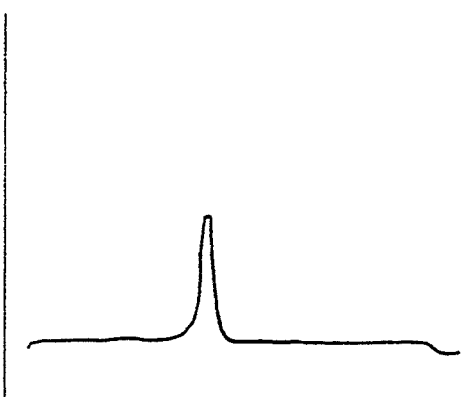

A He-Ne laser of wavelength 0.6328 μm is used to test the splitter, the input light is first polarized by a polarizer then focused into the splitter by a 40× lens. The output light of the splitter is collected by another 40× lens and detected by a linear detector array. FIGS. 2(a)–2(c) show the measured results. FIG. 2(a) shows the results measured by using a polarizer which polarizes the incident light with an angle of 45 degree relative to the z-axis. FIGS. 2(b) and 2(c) show the optical field distributions when the incident light is polarized to an angle of 0 and 90 degrees relative to the z-axis, respectively. The TM mode is guided by the NI waveguide, and similarly, only the TE mode is found in the MILO waveguide. The measured extinction ratios were 21 dB for the TE mode and 24 dB for the TM mode.

Figure 3A:
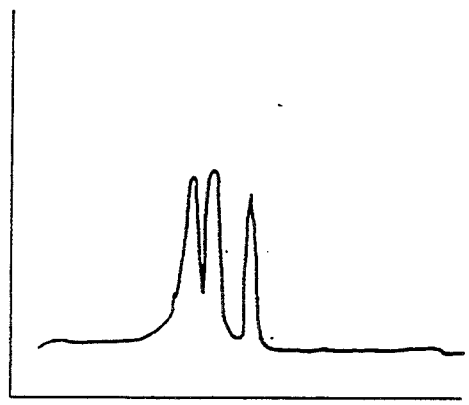
FIGS. 3(a) to 3(c) are plots which show neat-field distributions at the output end of the present splitter (type 1): 3(a) both TE and TM modes; 3(b) TE mode; and 3(c) TM mode, wherein the strip widths of the TI, NI, and MILO waveguides are equal to 5, 6, and 4 μm, respectively.
Figure 3B:
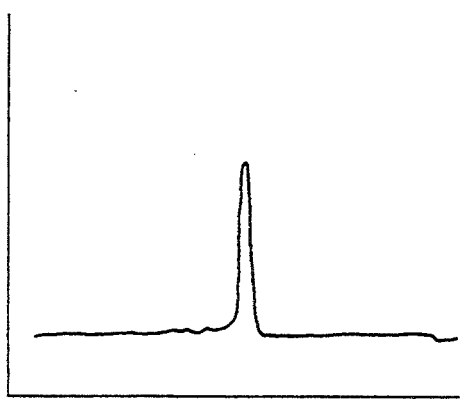
Figure 3C:
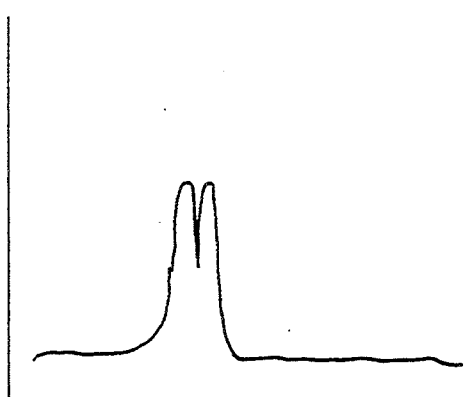

Another TE-TM mode splitter was also made using the same diffusion conditions as those for TI, NI, and MILO waveguides, except that the strip widths of these waveguides were changed. The strip widths of Ti, Ni, and MgO are 5 μm, 6 μm, and 4 μm, respectively. FIGS. 3(a)–(c) show the results measured by rotating the polarizer to 45, 0, and 90 degrees relative to the z-axis, respectively. The measured extinction ratios were 20.7 dB for the TE mode and 22 dB for the TM mode. As can be seen from these figures, the NI waveguide has two modes when its strip width is 6 μm. Previous TE-TM power splitter operated under multimode conditions has a low extinction ratio. However, in this invention, splitters operated under multimode conditions can be easily achieved with high extinction ratios. Thus, the new TE-TM mode splitters, using three different diffusion materials, indeed have a larger tolerance of fabrication and capable of splitting multiple TE and TM modes.

EXAMPLE 2

The waveguides in the splitter are made on a z-cut, x-propagated lithium niobate substrate. The input waveguide is made by the TI process. Arm 1 of the Y-branch, bent from the TI waveguide with an angle θ of 0.5°, is made by the NI process, and arm 2 of the Y-branch, disconnected to TI waveguide, is made by the PE process. The TI waveguide was formed by diffusing a titanium strip of width 4 μm and thickness 200Å into lithium niobate at 1050° C. for 6 hr. The diffusion process is performed in an alumina crucible with a little lithium oxide powder to eliminate the unwanted outdiffusion guiding layer. The second step is to fabricate the ordinary-polarized NI waveguide. This waveguide was made by diffusing a nickel strip of width 4 μm and thickness 300Å at 950° C. for 5 hr. The last step is the fabrication of the PE waveguide. A tantalum film of thickness 400Å deposited on the lithium niobate by electron gun evaporation was used as the mask for proton exchange. After opening a waveguide pattern of width 4 μm on the mask, the substrate was immersed into the benzoic acid at 235° C. for 2 hr. To reduce the propagation loss, the PE waveguide was then annealed at 300° C. for 6 hr.

Figure 4A:
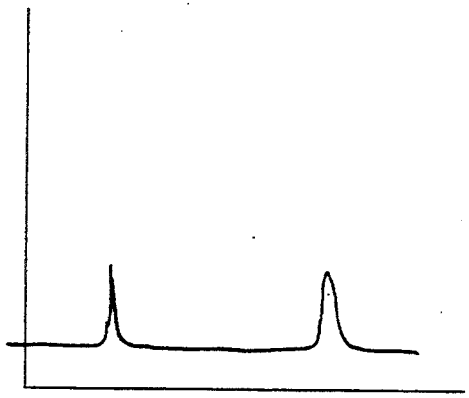
FIGS. 4(a) to 4(c) are plots which show near field distributions at the output end of the present splitter (type 2): 4(a) both TE and TM modes; 4(b) TE mode; and 4(c) TM mode, wherein the strip widths of the TI, NI, and PE waveguides are all equal to 4 μ.
Figure 5A:
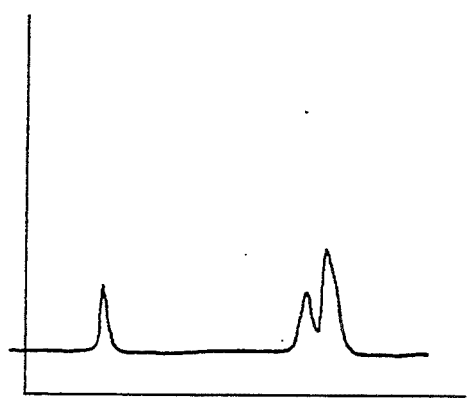
FIGS. 5(a) to 5(c) are plots which show near field distributions at the output end of the present splitter (type 2): 5(a) both TE and TM modes; 5(b) TE mode; and 5(c) TM mode, wherein the strip widths of the TI, NI, and PE waveguides are equal to 5, 6, and 4 μm, respectively.
Figure 4B:
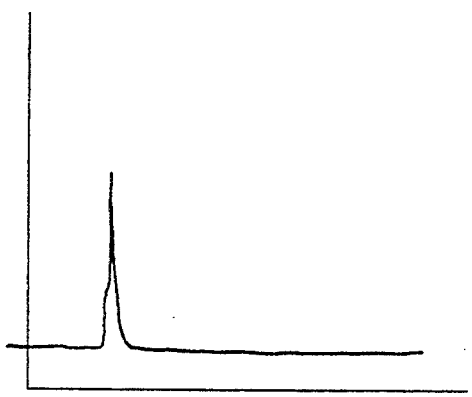
Figure 5B:
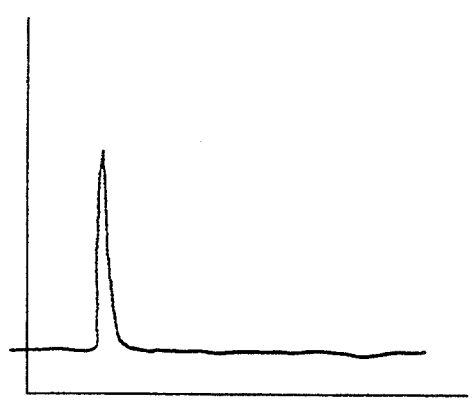
Figure 4C:
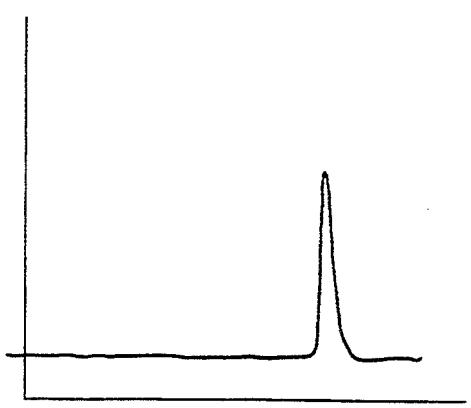
Figure 5C:
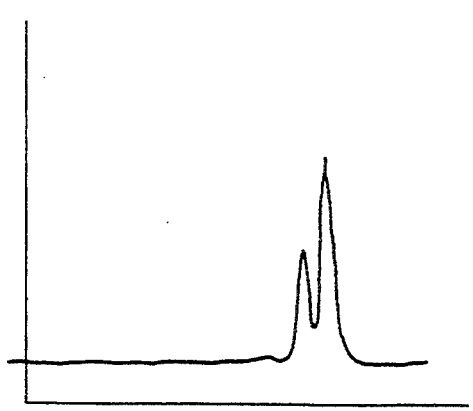

Measurement of the TE-TM mode splitter was also done by a He-Ne laser of wavelength 0.6328 μm. The incident light is focused directly to the waveguide end facet by a 40× lens to excite both TE and TM modes. The output power distribution is enlarged by a 40× lens and passed through a polarizer to investigate their polarization states. FIGS. 4(a)–4(c) show the power distributions measured by a linear detector array with polarization angles of 45°, 0°, and 90° relative to the y-axis, respectively. Note that only the TE mode is supported by the NI waveguide, and similarly, only the TM mode is found in the PE waveguide. The measured extinction ratios were 24 dB for the TE mode and 23 dB for the TM mode. Another TE-TM mode splitter-was also made using the same fabrication processes as those for TI, NI, and PE waveguides, except that the strip widths of these waveguides were 5 μm, 6 μm, and 4 μm, respectively. FIGS. 5(a)–(c) show the similar results like those of FIGS. 2(a)–(c). As can be seen from these figures, the NI waveguide supports a multimode wave. The measured extinction ratios were 22 dB for the TE mode and 21 dB for the TM mode.

The TE-TM mode splitters of the present invention have the following advantages and characteristics:
(1) large fabrication tolerance;
(2) high extinction ratio;
(3) operation under single-mode or multimode conditions; and
(4) operation under different wavelengths.

What is claimed is:

1. A TE-TM mode splitter comprising an asymmetric Y-junction structure in a lithium niobate substrate, wherein said Y-junction structure is composed of an input straight waveguide and two output branch waveguides, wherein said input straight waveguide is a titanium indiffusion channel waveguide and it can guide both the TE and TM modes: one of said two output branch waveguides is a nickel indiffusion channel waveguide and it can guides only the ordinary-polarized mode; and the other output branch waveguide of said two output branch waveguides is a MgO induced lithium outdiffusion channel waveguide or a proton exchanged channel waveguide and said other output branch waveguide guides only the extraordinary-polarized mode in the lithium niobate substrate.

2. The TE-TM mode splitter according to claim 1, wherein said nickel indiffusion channel waveguide is made by a process which comprises the following steps: depositing a nickel strip of width of 3–12 μm and thickness of 100–800Å on said lithium niobate substrate, and then heating the deposited lithium niobate substrate at 950°–1050° C. for 1–12 hours.

3. The TE-TM mode splitter according to claim 1, wherein said MgO induced lithium outdiffusion channel waveguide is made by a process which comprises the following steps: depositing a MgO strip of width of 3–12 μm and thickness of 100–800Å on said lithium niobate substrate, and then heating the substrate at 900–1050° C. for 0.1–1.0 hour.

4. The TE-TM mode splitter according to claim 1, wherein said proton exchanged channel is made by a process which comprises the following steps: depositing a masking layer of a metal film having a thickness of 400–2000Å on said lithium niobate substrate, opening a waveguide pattern of width 3–12 μm on the masking layer, and then immersing the resulting patterned lithium niobate substrate into an acid at 150°–250° C. for 1–12 hours.

* * * * *